US011788575B2

(12) United States Patent
Parker et al.

(10) Patent No.: US 11,788,575 B2
(45) Date of Patent: Oct. 17, 2023

(54) SOCKET ASSEMBLY WITH A RETENTION DEVICE

(71) Applicant: FEDERAL-MOGUL MOTORPARTS LLC, Southfield, MI (US)

(72) Inventors: Glen C. Parker, Saint Peters, MO (US); Eric M. Kopsie, Bethalto, IL (US)

(73) Assignee: Federal-Mogul Motorparts LLC, Southfield, MI (US)

(*) Notice: Subject to any disclaimer, the term of this patent is extended or adjusted under 35 U.S.C. 154(b) by 878 days.

(21) Appl. No.: 16/413,923

(22) Filed: May 16, 2019

(65) Prior Publication Data

US 2019/0353200 A1 Nov. 21, 2019

Related U.S. Application Data

(60) Provisional application No. 62/673,616, filed on May 18, 2018.

(51) Int. Cl.
*F16C 11/06* (2006.01)

(52) U.S. Cl.
CPC ...... *F16C 11/0628* (2013.01); *F16C 11/0623* (2013.01); *F16C 11/0685* (2013.01); *F16C 11/0647* (2013.01)

(58) Field of Classification Search
CPC ... F16C 11/06; F16C 11/0623; F16C 11/0685; F16C 11/0628; F16C 11/0647;

(Continued)

(56) References Cited

U.S. PATENT DOCUMENTS 3,089,718 A 5/1963 Gottschaid et al.
3,260,543 A * 7/1966 Henry-Biabaud .... F16C 11/086
384/208

(Continued)

FOREIGN PATENT DOCUMENTS

CN 1509381 A 6/2004
CN 101405106 A 4/2009

(Continued)

OTHER PUBLICATIONS

International Search Report, dated Jul. 22, 2019 (PCT/US2019/032760).

*Primary Examiner* — Daniel J Wiley
(74) *Attorney, Agent, or Firm* — Robert L. Stearns; Dickinson Wright PLLC

(57) ABSTRACT

The ball socket assembly includes a housing that is made of a monolithic piece which includes a lower wall. A ball portion of a ball stud is disposed in an inner bore of the housing. An exit bearing, which is made of a polymeric material, is disposed in the inner bore and is in slidable contact with at least one hemisphere of the ball portion. The exit bearing has an upper surface which faces towards an open end of the housing. A cover plate is in direct contact with the upper surface of the exit bearing along a surface-to-surface contact area. The surface-to-surface contact area is angled towards the open end from its radially outermost end to its radially innermost end for supporting the exit bearing against radial expansion in response to axial loads being applied on the exit bearing from the ball portion of the ball stud.

11 Claims, 4 Drawing Sheets

(58) Field of Classification Search
CPC ..... Y10T 403/32754; Y10T 403/32737; Y10T 403/32713; Y10T 403/32631
See application file for complete search history.

(56) References Cited

U.S. PATENT DOCUMENTS

| | | | | |
|---|---|---|---|---|
| 3,272,541 | A * | 9/1966 | Latzen | F16C 11/0647 403/138 |
| 3,679,248 | A * | 7/1972 | Herbenar | F16C 11/0647 403/140 |
| 4,286,363 | A * | 9/1981 | Morin | B23P 15/003 384/903 |
| 4,318,627 | A | 3/1982 | Morin | |
| 4,504,166 | A * | 3/1985 | Morin | F16C 11/0628 403/147 |
| 4,559,692 | A | 12/1985 | Morin | |
| 5,496,125 | A * | 3/1996 | Maughan | F16C 11/0638 403/136 |
| 5,564,853 | A * | 10/1996 | Maughan | F16C 11/069 29/898.047 |
| 5,772,337 | A * | 6/1998 | Maughan | F16C 11/0685 384/208 |
| 5,997,208 | A * | 12/1999 | Urbach | F16C 11/0633 403/135 |
| 6,010,271 | A * | 1/2000 | Jackson | F16C 11/0628 403/132 |
| 6,042,293 | A * | 3/2000 | Maughan | F16C 11/068 403/135 |
| 6,171,012 | B1 * | 1/2001 | Westphal | F16C 11/0638 403/135 |
| 8,047,739 | B2 * | 11/2011 | Sellers | F16C 11/0628 403/135 |
| 9,056,538 | B2 | 6/2015 | Kuroda | |
| 9,291,195 | B1 * | 3/2016 | Parker | F16C 11/068 |
| 9,845,823 | B1 * | 12/2017 | Yaworsky | B60G 7/005 |
| 2002/0154941 | A1 * | 10/2002 | Broker | F16C 11/0633 403/133 |
| 2003/0077114 | A1 | 4/2003 | Broeker et al. | |
| 2003/0081989 | A1 * | 5/2003 | Kondoh | F16C 11/0671 403/135 |
| 2004/0047677 | A1 * | 3/2004 | Schonhoff | F16C 11/0628 403/135 |
| 2004/0146338 | A1 | 7/2004 | Broker et al. | |
| 2005/0105961 | A1 * | 5/2005 | Kondoh | F16C 11/0671 403/122 |
| 2005/0207830 | A1 * | 9/2005 | Brunneke | F16C 11/0647 403/122 |
| 2005/0220531 | A1 * | 10/2005 | Sellers | F16C 11/069 403/132 |
| 2007/0163100 | A1 | 7/2007 | Schmidt et al. | |
| 2009/0152834 | A1 * | 6/2009 | Richter | F16C 11/068 280/504 |
| 2014/0205366 | A1 * | 7/2014 | Mevorach | B60G 7/005 403/144 |
| 2016/0025129 | A1 * | 1/2016 | Parker | F16C 11/0671 29/516 |
| 2016/0177998 | A1 * | 6/2016 | Karpman | F16C 11/0685 403/135 |
| 2017/0356489 | A1 * | 12/2017 | Parker, Jr. | F16C 11/0685 |
| 2018/0163775 | A1 * | 6/2018 | Gräber | F16C 11/069 |
| 2019/0390706 | A1 * | 12/2019 | Gräber | F16C 11/069 |
| 2020/0025239 | A1 * | 1/2020 | Blair | F16C 11/0628 |
| 2020/0040937 | A1 * | 2/2020 | Parker | F16C 11/068 |
| 2020/0072277 | A1 * | 3/2020 | Wilhelm | F16C 11/069 |

FOREIGN PATENT DOCUMENTS

| | | |
|---|---|---|
| DE | 19842198 A1 | 4/2000 |
| EP | 0020214 A1 | 12/1980 |
| FR | 2446694 A1 | 8/1980 |
| FR | 2498494 A1 | 7/1982 |
| JP | H0587119 A | 4/1993 |
| JP | 2012017775 A | 1/2012 |
| WO | 2016089819 A1 | 6/2016 |
| WO | 2016202514 A1 | 12/2016 |

* cited by examiner

SOCKET ASSEMBLY WITH A RETENTION DEVICE

CROSS-REFERENCE TO RELATED APPLICATION

This application claims the benefit of U.S. Provisional Application No. 62/673,616, filed May 18, 2018, the entire contents of which is hereby incorporated by reference.

BACKGROUND OF THE INVENTION

1. Field of the Invention

The present invention is related generally to socket assemblies of the type that are configured for use in a vehicle suspension assembly.

2. Related Art

A ball joint is a type of socket assembly which includes a housing and a ball stud which can articulate and rotate relative to one another. Such ball joints are commonly found in automobile suspension systems to connect a pair of control arms with a knuckle. Each ball joint typically includes one or more bearings that are received in an open interior of the housing between the housing and the ball stud to allow the knuckle to move relative to the control arms.

In applications where axial forces are applied on the ball stud in the same direction as that which the ball stud extends out of the housing, it is necessary to support those forces (negative loads) in a manner which restricts the axial movement of the bearings and the ball stud within the housing. In cases where the bearings are made of plastic, the plastic material can expand under load due to a contact angle between the bearing and the ball stud. Thus, a metallic cover plate is necessary to restrict the axial movement of the ball stud while simultaneously restricting movement of the plastic bearing. In cases where very heavy negative loads are expected, the cross-sectional size of the metallic cover plate and/or the strength type of metal of the cover plate is increased to obtain the strength needed to support the large negative axial loads. Either of these solutions (increasing the thickness or strength of the cover plate) typically increases the cost to manufacture the ball joint and may interfere with or restrict stud swing of the ball stud within the housing.

SUMMARY OF THE INVENTION AND ADVANTAGES

One aspect of the present invention is related to a ball socket assembly, such as for use in a vehicle suspension or steering system. The ball socket assembly includes a housing that is made of a monolithic piece which includes a lower wall. The housing has an inner bore which extends along a central axis from a closed first end at the lower wall to an open second end opposite of the lower wall. The ball socket assembly further includes a ball stud which has a ball portion and a shank portion. The ball portion is disposed in the inner bore of the housing and has opposing first and second hemispheres. The shank portion projects out of the housing through the open second end. An exit bearing, which is made of a polymeric material, is disposed in the inner bore of the housing and is in slidable contact with at least one of the first and second hemispheres of the ball portion of the ball stud. The exit bearing has an upper surface which faces axially towards the open second end of the housing. A cover plate is also disposed in the inner bore in direct contact with the upper surface of the exit bearing along a surface-to-surface contact area that has an annular shape to capture the exit bearing in the inner bore of the housing. The surface-to-surface contact area is angled towards the open second end of the housing from a radially outermost end of the surface-to-surface contact area to a radially innermost end of the surface-to-surface contact area for supporting the exit bearing against radial expansion in response to axial loads being applied on the exit bearing from the ball portion of the ball stud.

According to another aspect of the present invention, the cover plate has a top surface which faces towards the open second end of the inner bore. The top surface has an inner edge and an outer edge and, in the axial direction, the outer edge is closer to the open second end of the inner bore than the inner edge for allowing increased swing angle of the ball stud relative to the housing.

According to yet another aspect of the present invention, the top surface of the cover plate has a partial torus shape.

According to still another aspect of the present invention, the housing is deformed radially inwardly adjacent the open second end of the inner bore to capture the cover plate in the inner bore.

According to a further aspect of the present invention, the cover plate is made of metal.

According to yet a further aspect of the present invention, the cover plate extends outwardly past an outermost periphery of the exit bearing.

According to still a further aspect of the present invention, the exit bearing is in slidable with both the second hemisphere of the ball portion and with an equator of the ball portion, wherein the equator separates the first and second hemispheres.

According to another aspect of the present invention, the exit bearing is in a tight-fitting relationship with an inner surface of the housing.

According to yet another aspect of the present invention, the ball socket assembly further includes a backing bearing which is made as a separate piece from the exit bearing. The backing bearing is disposed in the inner bore of the housing and is in slidable contact with the first hemisphere of the ball portion of the ball stud.

According to still another aspect of the present invention, the lower wall of the housing is shaped to its final form through at least one of a casting, forging, and machining operation.

Another aspect of the present invention is related to a method of making a ball socket assembly. The method includes the step of preparing a housing that is made as a monolithic piece including a lower wall and an inner bore. The inner bore extends along a central axis from a closed first end at the lower wall to an open second end opposite of the lower wall. After at least the lower wall of the housing is shaped to its final form, the method continues with the step of inserting a ball portion of a ball stud into the inner bore of the housing through the open second end. The ball portion has a first hemisphere, a second hemisphere, and an equator which separates the first and second hemispheres. The method proceeds with the step of inserting an exit bearing, which is made of a polymeric material, into the inner bore of the housing through the open second end. The method continues with the step of establishing slidable contact between at least one of the first and second hemispheres of the ball portion and the exit bearing. The method proceeds with the steps of inserting a cover plate into the inner bore of the housing through the open second end and establishing direct contact between an upper surface of the exit bearing and a bottom surface of the cover plate along a surface-to-surface contact area. The surface-to-surface contact area is angled axially towards the open second end of the housing from a radially outermost end of the surface-to-surface contact area to a radially innermost end of the surface-to-surface contact area for resisting radial expansion of the exit bearing in response to axial loads being applied to the exit bearing from the ball portion of the ball stud.

According to another aspect of the present invention, the cover plate has a top surface which faces towards the open second end of the inner bore. The top surface has an inner edge and an outer edge. The outer edge is closer to the open second end of the inner bore than the inner edge for allowing an increased swing angle range of the ball stud relative to the housing.

According to yet another aspect of the present invention, the top surface of the cover plate has a partial torus shape.

According to still another aspect of the present invention, the housing is deformed radially inwardly adjacent the open second end of the inner bore to capture the cover plate in the inner bore.

According to a further aspect of the present invention, the cover plate is made of metal.

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
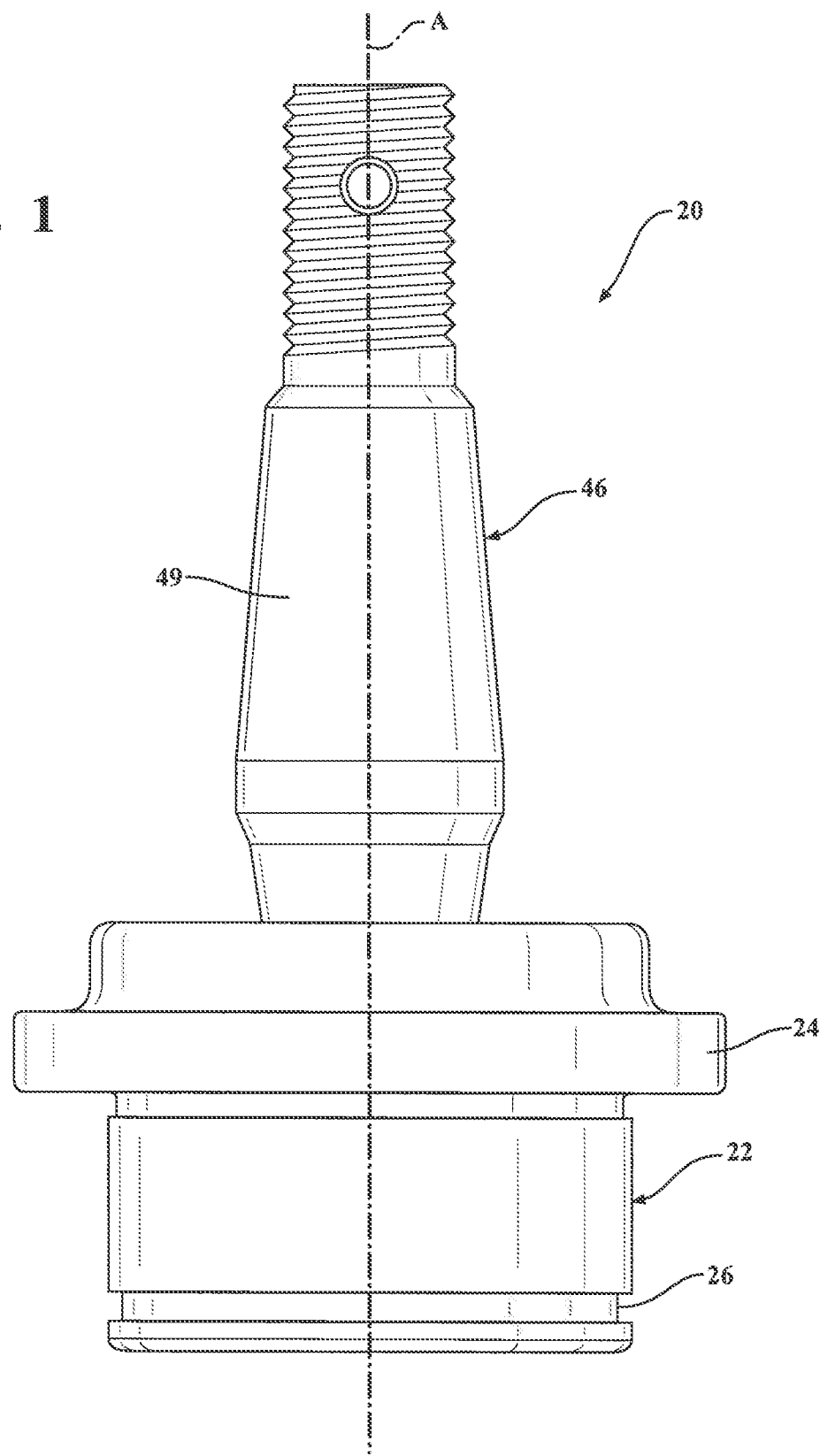
FIG. 1 is a front elevation view of an exemplary embodiment of an exemplary embodiment of a ball joint constructed according to one aspect of the present invention.

Referring to the Figures, wherein like numerals indicate corresponding parts throughout the several views, a ball socket assembly 20 in the form of a ball joint 20 for a vehicle is generally shown in FIG. 1. The exemplary of the ball joint 20 is of the type which may experience either high compression loads (positive loads) or high tension loads (negative loads) and configured for use in a steering and suspension system (not shown) of a vehicle. For example, the ball joint 20 could be employed to operably connect a control arm (not shown) with a knuckle (not shown) or it could be a part of a tie rod end (not shown) for connecting a steering rack (not shown) with the knuckle. It should be appreciated that the ball joint 20 as described herein could find uses in a range of other automotive or non-automotive applications.

Figure 2:
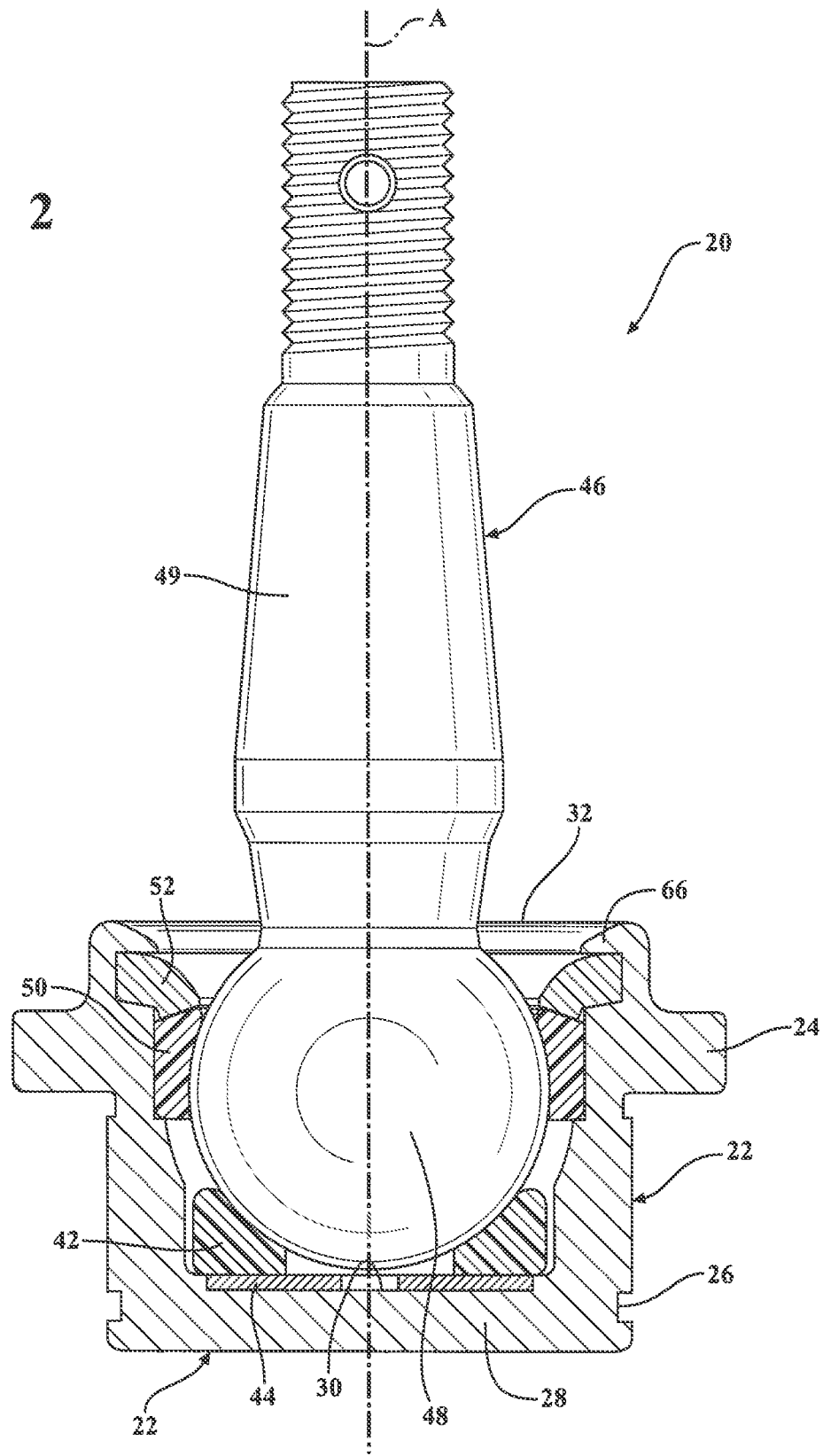
FIG. 2 is a partial cross-sectional view of the ball joint of FIG. 1.
Figure 3:
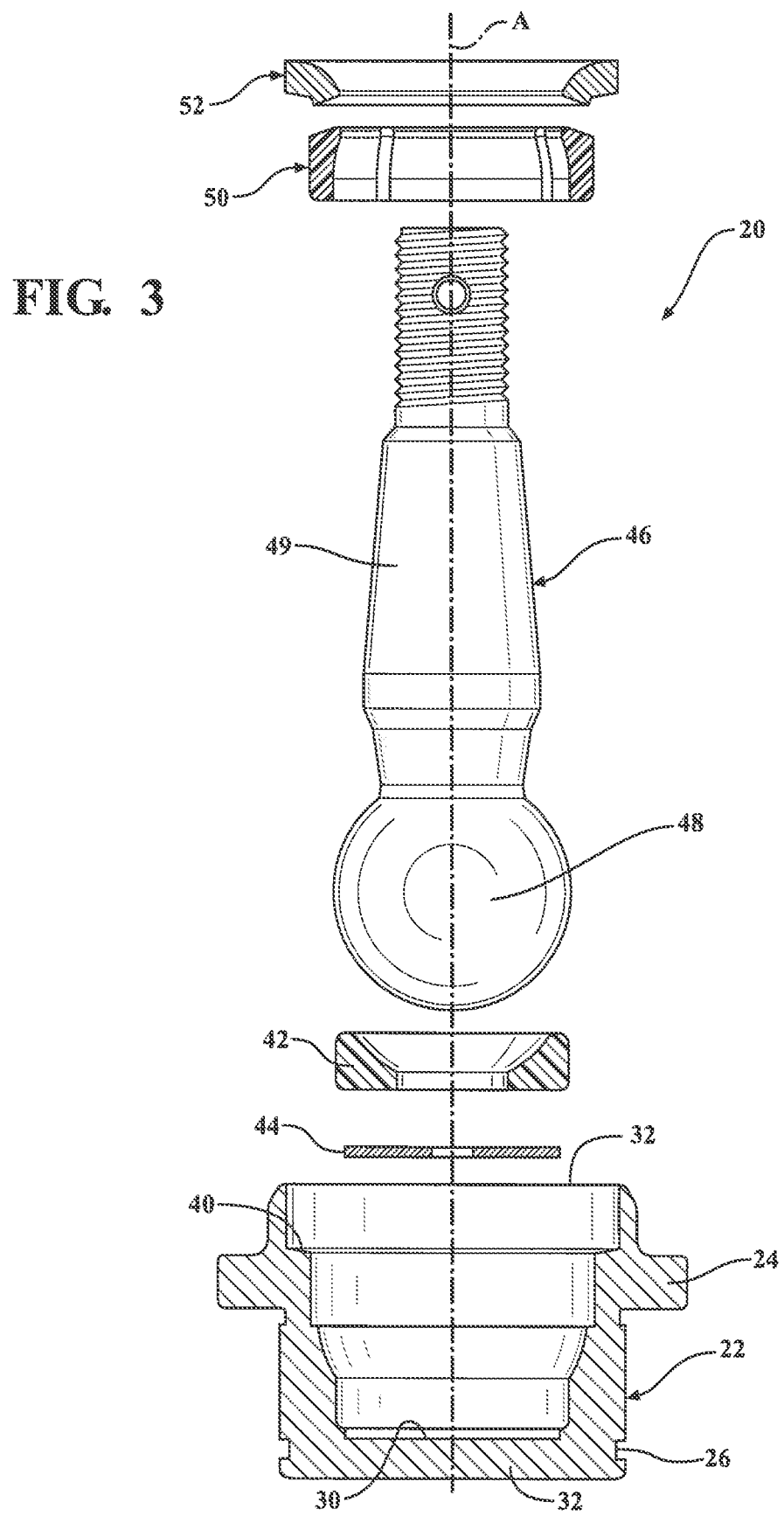
FIG. 3 is an exploded view of the ball joint of FIG. 1.
Figure 4:
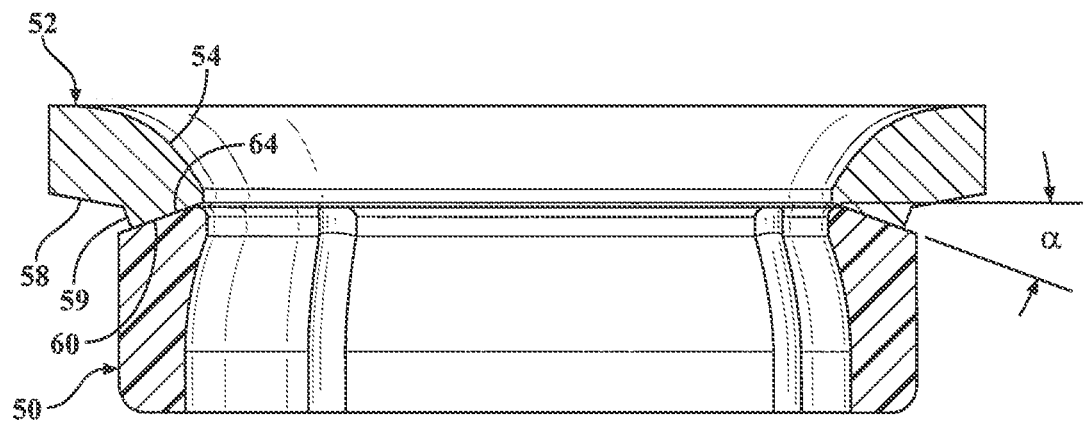
FIG. 4 is a cross-sectional view of an exit bearing and a cover plate of the ball joint of FIG. 1.

Referring now to FIGS. 2 and 3, the exemplary embodiment of the ball joint 20 includes a cartridge-style housing 22 which can be press-fit into an opening of a first component, such as the control arm. The housing 22 has a cylindrical exterior surface which may be knurled to provide an improved interference fit with the first component when received in the opening. The housing 22 also has a radially outwardly extending flange 24 which defines a stopping point for press-fitting the housing 22 into the opening during installation into the first component. The housing 22 also has a circumferentially extending groove 26 which is spaced from the flange 24 for receiving a retainer ring (not shown) to lock the housing 22 with the first component.

Figure 5:
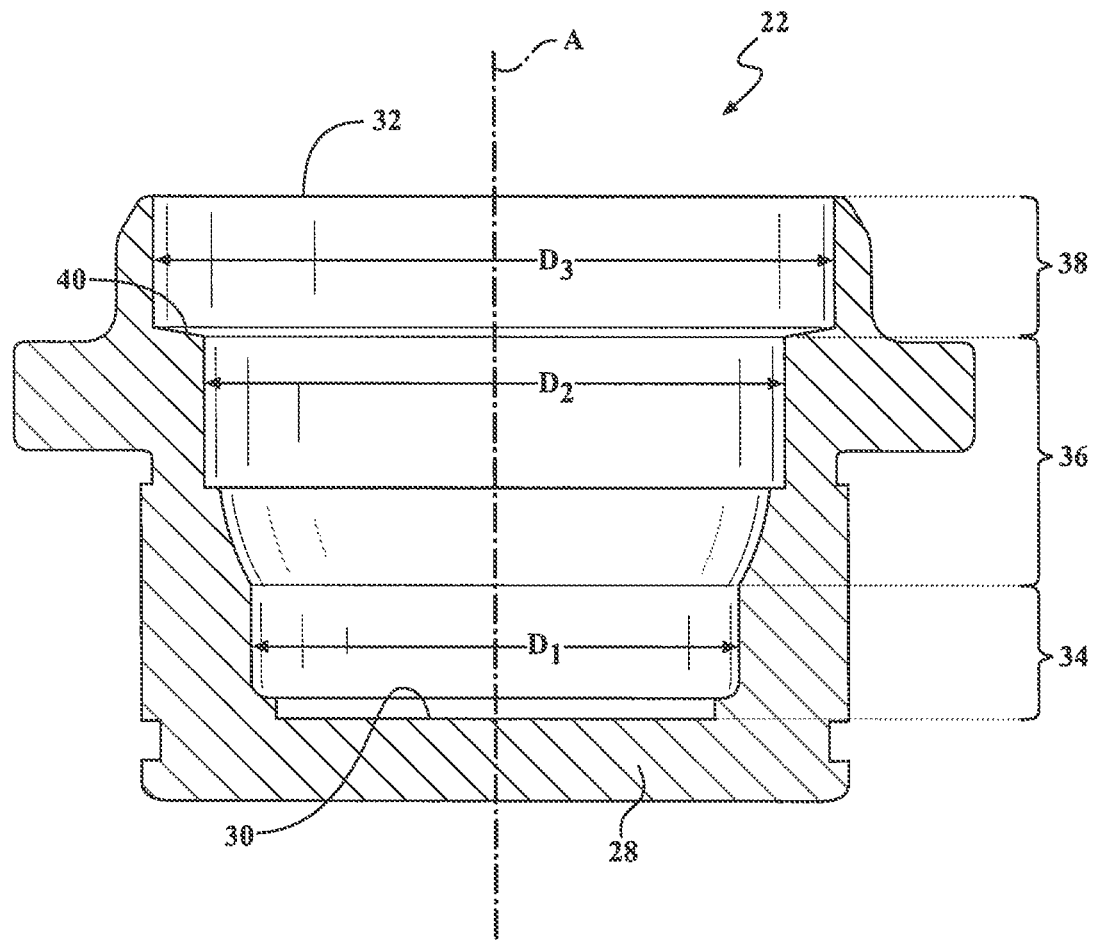
FIG. 5 is a cross-sectional view of a housing of the ball joint of FIG. 1.

As shown in FIG. 5, the housing 22 has an inner bore which extends along a vertical central axis A from a lower wall 28 at a closed first end 30 to an open second end 32. In the axial direction from the closed first end 30 to the open second end 32, the inner bore has first, second, and third portions 34, 36, 38 with progressively increasing diameters $D_1$, $D_2$, $D_3$. More specifically, the first portion 34 adjacent the closed first end 30 has a first diameter $D_1$, the second portion 36 has a greater second diameter $D_2$, and the third portion 38 adjacent the open second end 32 has a still greater third diameter $D_3$. Between the second and third portions 36, 38, the housing 22 presents a shoulder 40 which faces towards the open second end 32.

The housing 22 is preferably made as a single, monolithic piece of metal, such as steel or an alloy steel, and may be shaped through any suitable process or processes including, for example, casting, forging, machining from a billet, etc. At least the lower wall 28 is preferably shaped to its final form via at least one of the casting, forging, and machining operations. That is, the lower wall 28 is not bent or otherwise plastically deformed to its final shape. As discussed in further detail below, shaping the lower wall 28 to its final form without plastic deformation allows the ball joint 20 to be compression loaded whereby positive axial loads are exerted on the lower wall 28 when the ball joint 20 is installed in a vehicle suspension system.

Referring now additionally to FIGS. 2 and 3, a backing bearing 42 is disposed in the first portion 34 of the inner bore and has an outer diameter which is less than the first diameter $D_1$ such that the backing bearing 42 can radially move, or float, within the inner bore. A thrust washer 44, which is made of a low friction material such as Nylon, is disposed in the first portion 34 of the inner bore between the backing bearing 42 and the lower wall 28 to provide a low friction interface between the backing bearing 42 and the housing 22. Alternately or additionally, a washer spring (not shown) may be disposed in the inner bore to impart an upward biasing force against the backing bearing 42.

The ball joint 20 further includes a ball stud 46 which has a ball portion 48 and a shank portion 49. The ball portion 48 is disposed in the inner bore of the housing 22 and has a semi-spherically curved outer surface with a lower hemisphere, an equator, and an upper hemisphere. The backing bearing 42 has a curved first bearing surface which supports the lower hemisphere of the ball portion 48 for transferring positive axial forces (upward) between ball stud 46 and the lower wall 28 of the housing 22. The shank portion 49 of the ball stud 46 projects out of the housing 22 through the open second end 32 for attachment with a second component (such as a knuckle) of the steering/suspension system. The ball stud 46 is preferably made of a single, monolithic piece of metal, such as steel or an alloy steel and may be shaped through any suitable process or combination of processes.

An exit bearing 50 is disposed in the second portion 36 of the inner bore and has a curved second bearing surface which is semi-spherically curved and is in slidable contact with both the upper hemisphere and the equator of the ball portion 48 of the ball stud 46. The curved first and second bearing surfaces of the backing and exit bearings 42, 50 respectively provide a low friction interface between the housing 22 and the ball stud 46, thereby allowing the ball stud 46 to articulate (swing) and to rotate relative to the housing 22 during operation of the vehicle. The exit bearing 50 is preferably in an interference fit with an inner surface of the housing 22 to restrict movement of the exit bearing 50 within the inner bore. A cylindrically shaped outer surface of the exit bearing 50 may be knurled to increase the strength of this interference fit. In the exemplary embodiment, at least the exit bearing 50 is made of a polymeric material (such as plastic) and is preferably shaped to its final form through an injection molding operation. Specifically, the exit bearing 50 is preferably made of a carbon fiber reinforced polyoxymethylene (Acetal) material. The backing bearing 42 may be made of plastic or metal A cover plate 52 is mostly disposed in the third portion 38 of the inner bore and is in direct contact with the exit bearing 50 for reinforcing the exit bearing 50 against radial expansion, as discussed in further detail below. During operation of the vehicle, negative axial forces (upward) are transferred from the ball stud 46, through the exit bearing 50, through the cover plate 52, and into the housing 22. The cover plate 52 has a top surface 54 and a bottom surface 58, 59 60. The bottom surface 58, 59, 60 has an outer portion 58 that sits against the shoulder 40 of the housing 22 to establish a fixed position of the cover plate 52 within the inner bore. The bottom surface 58, 59, 60 also has an inner portion 60 which extends downwardly into the second portion 36 of the inner bore and is in direct contact with an upper surface 64 of the backing bearing 42. The bottom surface 58, 59, 60 further includes a middle portion 59 which is angled downwardly at a steep angle and connects the outer and inner portions 58, 60. The cover plate 52 also has a cylindrical outer surface which is in contact with an inner surface of the housing 22 at the third portion 38 of the inner bore and which is located radially outwardly of an outermost periphery of the exit bearing 50. The cover plate 52 is made of metal (such as, for example, steel, an alloy steel, aluminum, or an aluminum alloy) and may be shaped through any suitable operation.

At the open second end 32, the metal material of the housing 22 is bent (such as through swaging) radially inwardly to define a lip 66 which engages a top surface 52 of the cover plate 52 and thereby trap the cover plate 52, exit bearing 50, ball portion 48, backing bearing 42, and thrust washer 44 within the inner bore. The cover plate 52 is preferably made as a single piece of metal, such as steel or an alloy steel and may be shaped through any suitable operation.

The upper surface 64 of the exit bearing 50 is generally frustoconical in shape and is angled at an angle α relative to a radial direction (i.e., perpendicular to the central axis A). Specifically, the upper surface 64 is angled towards the open second end 32 of the housing 22 from a radially outermost end to a radially innermost end of the exit bearing 50. The inner portion 60 of the bottom surface 58, 59, 60 of the cover plate 52 is also angled towards the open second end 32 of the housing 22 at the same angle α. The upper surface 64 of the exit bearing 50 and the inner portion 60 of the bottom surface 58, 59, 60 of the cover plate 52 are in direct contact with one another at a surface-to-surface contact area which surrounds the ball stud 46 and the central axis A.

During operation of the vehicle, negative (upwards) axial loads are exerted by the upper hemisphere of the ball portion 48 of the ball stud 46 onto the exit bearing 50. These axial loads are then redirected radially outwardly at the angled surface-to-surface contact area between the upper surface 64 of the exit bearing 50 and the bottom surface 58, 59, 60 of the cover plate 52 and are ultimately transferred to the housing 22. The combination of the tight fit of the exit bearing 50 in the second portion 36 of the inner bore and the angled surface-to-surface contact area with the cover plate 52 allows the plastic exit bearing 50 to resist radial expansion when exposed to negative axial loads from the ball stud 46. In other words, the cover plate 52 reinforces the exit bearing 50 against radial expansion when exposed to axial loads.

The top surface 54 of the cover plate 52 has a partial torus shape which extends from its inner edge to its outer edge. That is, the top surface 54 extends perpendicularly to the central axis A at its outer edge and curves downwardly towards its inner edge. Thus, in the axial direction, the outer edge is closer to the open second end 32 of the inner bore than the inner edge is. This configuration allows for increased swing angle of the ball stud 46 relative to the housing 22. Additionally, the torus shape of the top surface 54 more evenly spreads out stresses in the cover plate 52, thereby improving its resistance to deformation when exposed to loads as compared to other known cover plates that have less rounded top surfaces. In other words, the torus shape of the top surface 54 improves the strength and durability of the cover plate 52 without resorting to the use of costly high strength materials and while minimizing the mass of the cover plate 52. The torus configuration of the top surface 54 further increases the resistance of the cover plate 52 to bending when negative axial loads are applied on the ball stud 46, reduces the axial movement of the ball stud 46 when exposed to negative axial loads, and increased ball stud 46 pullout strength.

Additionally, in an axial direction, the angled surface-to-surface contact area between the exit bearing 50 and the cover plate 52 is set below (closer to the ball portion 48) the contact surfaces between the cover plate 58 and the housing 22. This increases the strength of the cover plate 52 by adding material to the cover plate 52 where it will not interfere with articulation of the ball stud 46.

Another aspect of the present invention is related to a method of making a ball joint 20, such as the ball joint 20 shown in FIGS. 1-5. The method includes the step of preparing the housing 22, which is preferably shaped through at least one of forging, casting, and machining. After the lower wall 28 is shaped to its final form, the method continues with the step of inserting the thrust washer 44 and then the backing bearing 42 into the inner bore of the housing 22 through the open second end 32. The method proceeds with the steps of inserting the ball portion 48 of the ball stud 46 into the inner bore of the housing 22 through the open second end 32 and establishing slidable contact between the backing bearing 42 and the ball portion 48. Next, the method continues with the steps of inserting the exit bearing 50 into the inner bore through the open second end 32 and establishing slidable contact between the exit bearing 50 and the ball portion 48 of the ball stud 46. The method proceeds with the step of inserting the cover plate 52 into the inner bore of the housing 22 through the open second end 32 and establishing direct contact between the upper surface 64 of the exit bearing 50 and the bottom surface 58, 59, 60 of the cover plate 52 along the angled surface-to-surface contact area. The method continues with the step of deforming the housing 22 at the open second end 32 to capture the cover plate 52, and the other components in the inner bore, within the housing 22. The method may also include the step of installing a dust boot 66 (not shown) onto the housing 22 to establish a fluid-tight seal between the housing 22 and the shank portion 49 of the ball stud 46.

Obviously, many modifications and variations of the present invention are possible in light of the above teachings and may be practiced otherwise than as specifically described while within the scope of the appended claims. It should also be appreciated that the use of directional terms, such as "upper", "lower", "top", and "bottom" are with reference to the orientations of certain features in the Figures and are not intended to require any particular orientation. Additionally, it is to be understood that all features of all claims and all embodiments can be combined with each other as long as they do not contradict each other.

What is claimed is:

1. A ball socket assembly, comprising:
a housing made of a monolithic piece including a lower wall and having an inner bore which extends along a central axis from a closed first end at said lower wall to an open second end opposite of said lower wall;
a ball stud having a ball portion and a shank portion, said ball portion being disposed in said inner bore of said housing, said ball portion having opposing first and second hemispheres, and said shank portion projecting out of said housing through said open second end;
an exit bearing disposed in said inner bore of said housing, said exit bearing being made of a polymeric material, said exit bearing being in slidable contact with at least one of said first and second hemispheres of said ball portion of said ball stud, and said exit bearing having an upper surface which faces axially towards said open second end of said housing;
a cover plate in direct contact with said upper surface of said exit bearing along a surface-to-surface contact area that has an annular shape to capture said exit bearing in said inner bore of said housing;
said surface-to-surface contact area being angled axially towards said open second end of said housing from a radially outermost end of said surface-to-surface contact area to a radially innermost end of said surface-to-surface contact area for supporting said exit bearing against radial expansion in response to axial loads being applied on said exit bearing from said ball portion of said ball stud,
said cover plate having a top surface facing towards said open second end of said inner bore, said top surface having an inner edge and an outer edge, and in an axial direction, said outer edge being closer to said open second end of said inner bore than said inner edge for allowing an increased swing angle range of said ball stud relative to said housing, and
wherein said top surface of said cover plate has a torus shape.

2. The ball socket assembly as set forth in claim 1 wherein said housing is deformed radially inwardly adjacent said open second end of said inner bore to capture said cover plate in said inner bore.

3. The ball socket assembly as set forth in claim 1 wherein said cover plate is made of metal.

4. The ball socket assembly as set forth in claim 1 wherein said cover plate extends radially outwardly past an outermost periphery of said exit bearing.

5. The ball socket assembly as set forth in claim 1 wherein said exit bearing is in slidable contact with both said second hemisphere of said ball portion and with an equator of said ball portion of said ball stud, said equator separating said first and second hemispheres.

6. The ball socket assembly as set forth in claim 1 wherein said exit bearing is in a tight-fitting relationship with an inner surface of said housing.

7. The ball socket assembly as set forth in claim 1 further including a backing bearing which is made as a separate piece from said exit bearing, said backing bearing being disposed in said inner bore of said housing, and said backing bearing being in slidable contact with said first hemisphere of said ball portion of said ball stud.

8. The ball socket assembly as set forth in claim 1 wherein said lower wall is shaped to its final form through at least one of a casting, forging, and machining operation.

9. A method of making a ball socket assembly, comprising the steps of:
preparing a housing that is made as a monolithic piece, the housing including a lower wall and an inner bore which extends along a central axis from a closed first end at the lower wall to an open second end opposite of the lower wall;
after at least the lower wall of the housing is shaped to its final form, inserting a ball portion of a ball stud into the inner bore of the housing through the open second end, the ball portion having a first hemisphere and a second hemisphere and an equator which separates the first and second hemispheres;
inserting an exit bearing into the inner bore of the housing through the open second end, the exit bearing being made of a polymeric material;
establishing slidable contact between at least one of the first and second hemispheres of the ball portion and the exit bearing;
inserting a cover plate into the inner bore through the open second end and establishing direct contact between an upper surface of the exit bearing and a bottom surface of the cover plate along a surface-to-surface contact area;
the surface-to-surface contact area being angled axially towards the open second end of the housing from a radially outermost end of the surface-to-surface contact area to a radially innermost end of the surface-to-surface contact area for resisting radial expansion of the exit bearing in response to axial loads being applied on the exit bearing from the ball portion of the ball stud;
wherein the cover plate has a top surface which faces towards the open second end of the inner bore, the top surface having an inner edge and an outer edge, and the outer edge being closer to the open second end of the inner bore than the inner edge for allowing an increased swing angle range of the ball stud relative to the housing; and
wherein the top surface of the cover plate has a torus shape.

10. The method as set forth in claim 9 wherein the housing is deformed radially inwardly adjacent the open second end of the inner bore to capture the cover plate in the inner bore.

11. The method as set forth in claim 9 wherein the cover plate is made of metal.

* * * * *